United States Patent [19]
Houck et al.

[11] Patent Number: 5,927,050
[45] Date of Patent: Jul. 27, 1999

[54] IN-BOX CONFIGURATION METHOD FOR A COMPUTER SYSTEM

[75] Inventors: Keith Coleman Houck, Rye, N.Y.; Howard J. Locker, Cary; David B. Rhoades, Apex, both of N.C.; John Joseph Edward Turek, South Nyack, N.Y.

[73] Assignee: International Business Machines Corporation, Armonk, N.Y.

[21] Appl. No.: 08/972,462

[22] Filed: Nov. 15, 1997

[51] Int. Cl.⁶ .................................................... B65B 69/00
[52] U.S. Cl. ......................... 53/428; 53/412; 395/200.5; 395/651
[58] Field of Search .................................. 206/305, 320, 206/701, 706; 53/412, 473, 474, 467, 133.1, 133.3, 133.4, 50, 428, 472; 395/200.5, 200.51, 200.52, 651, 652, 653

[56] References Cited

U.S. PATENT DOCUMENTS

| | | | |
|---|---|---|---|
| 4,398,212 | 8/1983 | Serry et al. | 206/320 X |
| 4,658,298 | 4/1987 | Takeda et al. | 206/320 X |
| 4,837,590 | 6/1989 | Sprague | 206/320 X |
| 4,932,524 | 6/1990 | Hodson | 206/320 |
| 4,949,934 | 8/1990 | Krenz et al. | 206/320 X |
| 5,058,745 | 10/1991 | Warner et al. | 53/472 X |
| 5,214,574 | 5/1993 | Chang | 206/320 X |
| 5,226,540 | 7/1993 | Bradbury | 206/320 X |
| 5,469,692 | 11/1995 | Xanthopoulos | 53/474 |
| 5,485,922 | 1/1996 | Butcher | 206/320 X |
| 5,666,265 | 9/1997 | Lutz et al. | 206/320 X |
| 5,667,072 | 9/1997 | Chang | 206/320 X |
| 5,682,993 | 11/1997 | Song | 206/320 |

Primary Examiner—Daniel B. Moon
Attorney, Agent, or Firm—George E. Grosser

[57] ABSTRACT

A method and apparatus for configuring a computer system is adapted to allow configuration to occur on the system unit without removing the system unit from its packaging. By so preparing and operating the unit that it can function to a degree as a network client, it is possible to perform steps for configuring "in the package" that violate normal self test expectations. With this abnormal operating environment and operation the system is placed in condition to be removed from the packaging at the user's location with BIOS and program image customized for the user. This approach provides a freshly configured system and yet eliminates unpacking at a configuration center and then repacking for transfer to the user or the need for refresh configuration at the user site as the system unit is set up for normal use.

8 Claims, 4 Drawing Sheets

IN-BOX CONFIGURATION METHOD FOR A COMPUTER SYSTEM

BACKGROUND OF THE INVENTION

The subject invention relates to configuration of computer systems in general and to methods for convenient, customized program and BIOS loading in particular.

It is normal to custom configure the system unit of a computer system for a user at a dealer, a corporate configuration center, or at the user site. When done at the dealer or at the configuration center the resources and skills needed are available but the computer must be removed from the packing, set up, configured with BIOS and a program image and then repackaged to be sent to the user. Alternatively, the configuration may be done at the manufacturer, prior to packaging, but it is difficult to provide the degree of customization usually desired without major inventory problems and the customizations tend to get "stale" (out of date) with time and may need to be redone. There may even be royalty expense waste with systems that go stale before they are deployed.

At the user site, roll out of generic systems is less efficient of resources but avoids the repackaging problem. For complex program images and system resource add-ons, it may be necessary to send out a skilled configuration expert thus consuming valuable skills with travel time to the user site and, like a doctor making house calls, leaving the expert without the full complement of diagnostic equipment and programs typically available at a configuration center.

SUMMARY OF THE INVENTION

The present invention recognizes that by configuring system units at the factory to be able to respond for configuration purposes when only power and a network connection are in place, it is possible to reconfigure a generic system unit in its packaging to provide customization for a respective user. This selective reconfiguration may be performed at configuration centers where a full complement of support and configuration alternatives are available while avoiding the time and danger of system injury that is present when custom configuration is performed with a full system unpack, setup, configure, breakdown and repackaging (does it ever fit back in the box the way it arrived?) followed by shipping to the user site. The invention involves a recognition that systems normally and for good reasons protect themselves from being operated as would be needed to configure in packaging and it is desirable to maintain albeit override these protections.

BRIEF DESCRIPTION OF THE DRAWINGS

Preferred implementations for the inventions will now be described with reference to the drawings wherein.

DESCRIPTION OF THE PREFERRED EMBODIMENT

Figure 1:
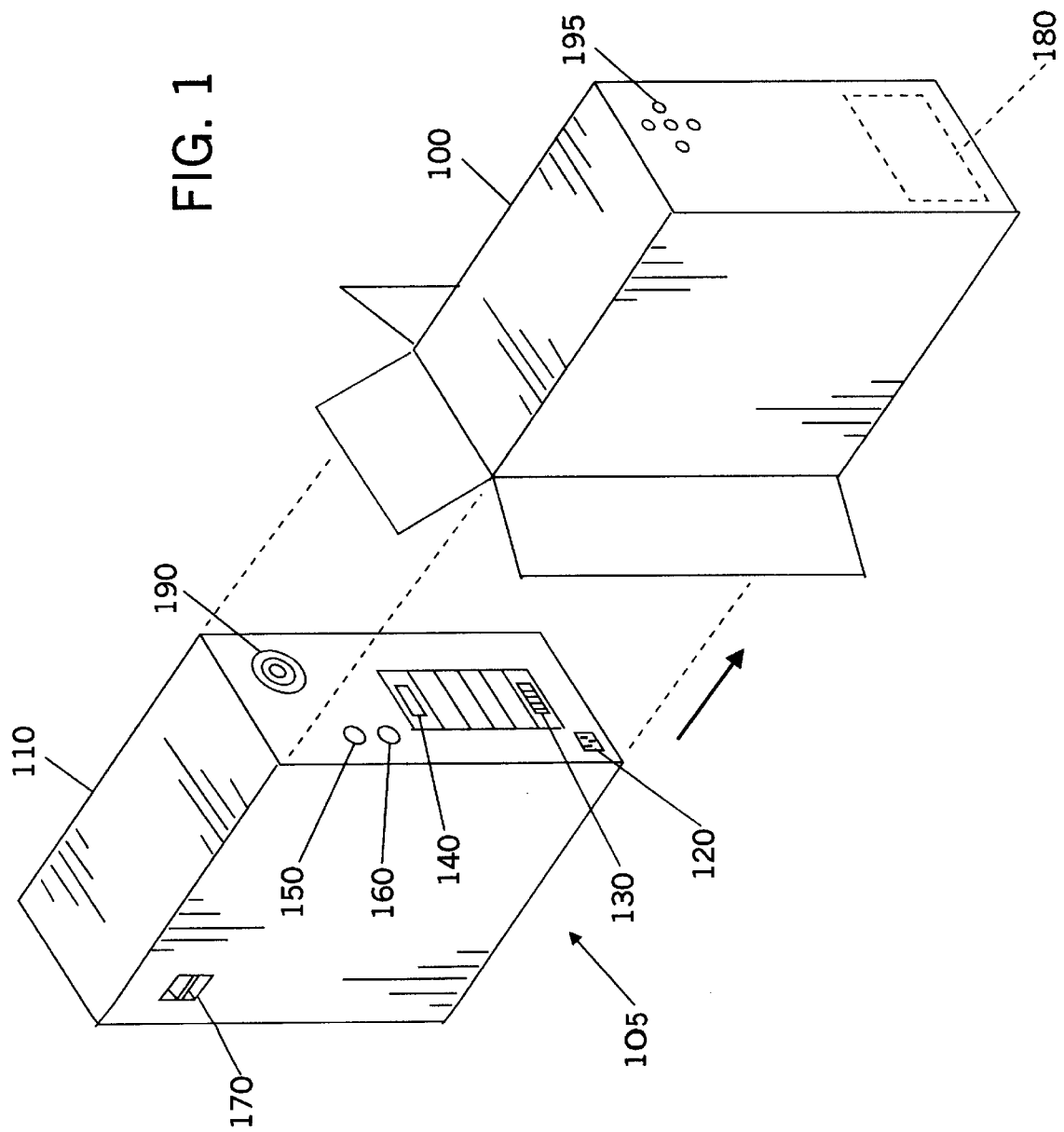
FIG. 1 is a pictorial illustration of a shipping package for a computer system unit that supports in-box configuration along with a computer system according to the invention.

Referring to FIG. 1, a shipping package or carton 100 of cardboard, preferably, is sized to enclose a computer apparatus 105 having a computer housing 110. The computer housing 110 encloses a computer system (discussed below with respect to FIG. 2) and has mounted thereto, to be externally accessible, a power connector 120, a network connector 130, a display connector 140, a keyboard connector 150, a mouse port 160 and a power switch 170. A section 180 of the package 100 is preferably identified adjacent to the power connector 120 and the network connector 130 to facilitate access thereto and may be identified by a slit to define a flap or by dashed lines to indicate a cutaway area. To reduce any weakening of the box it is preferred to arrange the network connector 130 to be near the power connector 120 so that only a small opening is needed. One or both of the normal carton flaps may also serve as the section 180 for access without unpacking.

The housing 110 preferably has a cooling fan 190 mounted to exhaust air from the housing. According to the invention apertures 195 are provided in package 100 to allow air to be expelled from the package. It is preferred that the apertures 195, which may be flaps or holes, be arranged to align with the exhaust of the cooling fan 190 to facilitate cooling of the housing 110 when enclosed in the box and energized as explained below. The opening at section 180 may serve as the cooling aperture 195 in some implementations.

Figure 2:
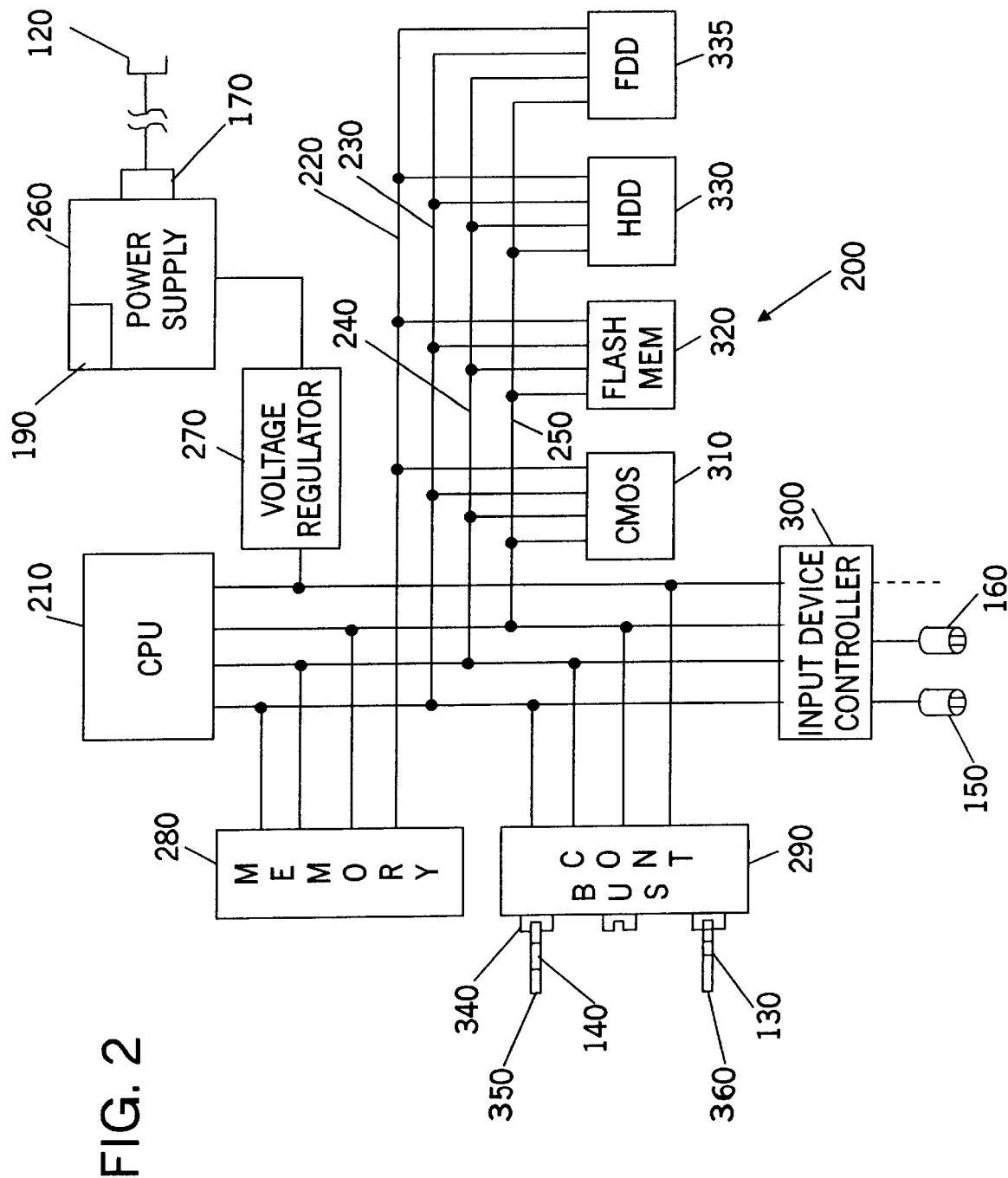
FIG. 2 is a diagrammatic representation of a computer system suitable for implementing the invention.

Now referring to FIG. 2 a computer system 200 mounted in computer housing 110 (see FIG. 1) includes a central microprocessor (CPU) 210 and is connected to a power bus 220, an address bus 230, a control bus 240, and a data bus 250 as is well known. A power supply 260 includes power switch 170 and is connected to connector 120. The power supply 260 has its output applied to a voltage regulator 270 which energizes the power bus 220. The power supply normally includes the cooling fan 190 but a separate fan or plural fans may be utilized. A system memory 280 is attached to busses 220, 230, 240 and 250 as are a peripheral bus controller 290, an input device controller 300 and writable storage media which may include CMOS storage 310, flash memory 320 and one or more hard disk drives 330. The system memory 280, as is well known, provides instructions to the CPU 210 for execution of various calculation and control functions. The keyboard connector 150 and mouse port controller 160 are connected to the input device controller 300. While a computer system has been described other electronic devices such as PDAs and televisions that require customization data may benefit from in-the-box customization of the invention.

The bus controller, as is well known, supports connectors 340 for receiving adapter cards. Inserted in the connectors 340 are a display adapter 350 and a network adapter 360 such as an Ethernet card. The display connector 140 is supported on the display adapter 350 and the network connector 130 is supported on the network adapter 350.

Figure 3:
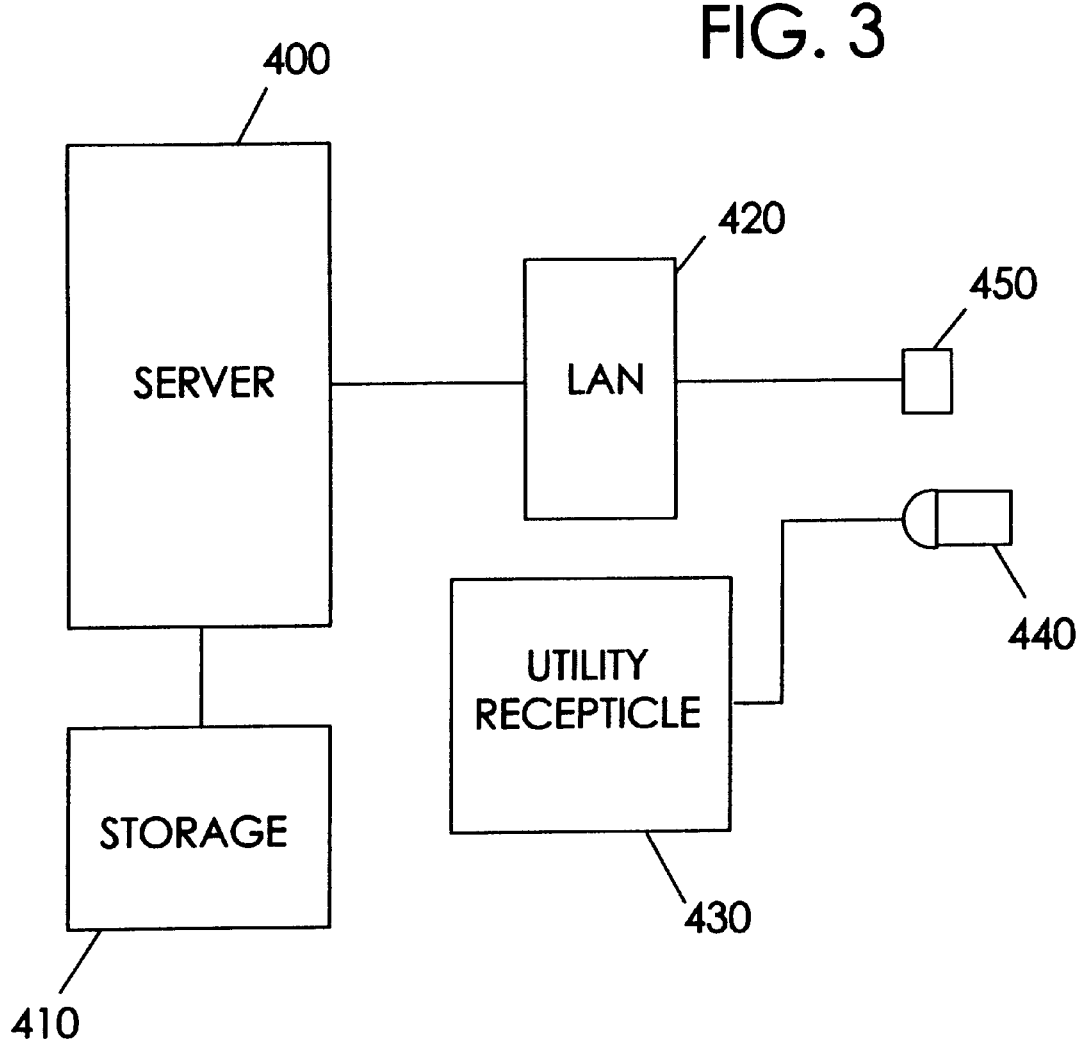
FIG. 3 is a diagrammatic representation of network and power sources for connecting to systems according to the invention.

Referring to FIG. 3, a server 400 is connected to a storage device 410 such as a hard drive which contains configuration and application data for installation on customer systems. The server is connected to a Local Area Network (LAN) 420 that has a connection port 450 compatible for connection at the network connector 130 to transfer boot data and configuration data to systems such as the system 200. It should be appreciated that any connecting device would suffice so long as the connector devices are able to transfer data according to the network protocol. Hence infra-red or radio coupling devices may serve as the connectors 130 and 450. A utility receptacle 430 is provided with a connector 440 that is compatible to attach to the power connector 120 of system 200.

To start configuration according to the invention, the connectors 120 and 130 (FIG. 1) are accessed through the package 100 through an aperture defined at section 180. The connectors 440 and 450 are attached to connectors 120 and 130, respectively, to achieve power and network connection to computer system 200. By packing the housing 100 with the power switch in the on position the computer system 200 will be energized to operate. If the computer system has a power switch that does not stay in the on state without power applied but is logic controllable then logic is preferably added to turn on the system when external power is applied and the network is connected at connector 130.

Figure 4:
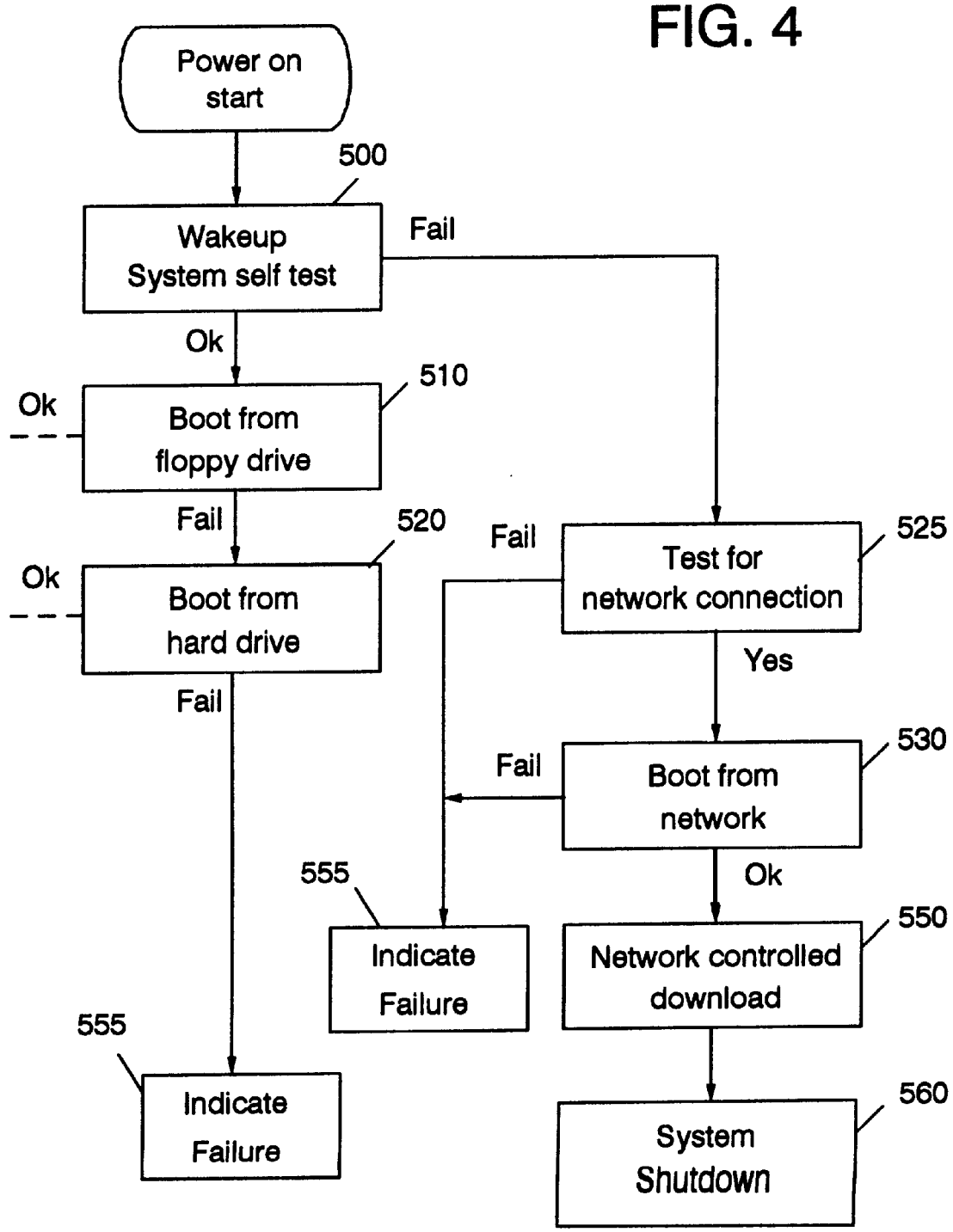
FIG. 4 is a flow chart describing logic to place a custom image on the hard drive of the system unit according to the invention.

Once the system is energized normal wake up (500) begins (see FIG. 4). As is well known, system BIOS logic stored, for example, in flash memory 320, starts wake up and run a self test to determine if devices are operative. For example, mouse or keyboard or display as would in a full system be connected at connectors 140, 150 or 160 are checked. If absent or faulty an error condition is set and startup halts. If self test is successful the system proceeds to attempt to boot from the floppy drive (510) and upon failure proceeds to the hard drive(520) and then, if unsuccessful, an error flag is set (555).

According to a preferred implementation for the invention, if self test fails, logic detecting the error signal checks (525) for a network connection over card 360 and, if there is a connection, initiates (530) receiving data therefrom. If connected according to the invention, the system 200 can receive data and boot instructions downloaded from the server 400 (FIG. 3). Once the system receives boot instructions to memory 280 it operates as if under a normal boot process but with the network connection as the boot instruction source. Once the system 200 is at a level of expanded operational capability as a result of the downloaded instructions, the server 400 proceeds with the download of data (550) such as configuration and application programs to the respective media such as flash memory 320, hard drive 330 and floppy disk drive 335.

This transfer preferably utilizes known LAN wake up technology such as IBM's Wake on LAN technology. With this technology the server 400 needs to supply a packet with the LAN MAC address, as is well known, to indicate to the card 360 that it is being addressed and should wake up. The server 200 then progressively brings the system to an operative level at which data can be transferred to the various storage media. After all configuration data, operating system code and application code is downloaded, the server 400 commands a shut down (560) and the connections at connectors 120 and 130 are removed to complete the configuration process. If for some reason the boot process fails a failure indication is posted (555).

In this way a computer apparatus 105 may be configured in the shipping box providing convenience and savings over full set-up at a configuration station or at the user site.

Figure 5:
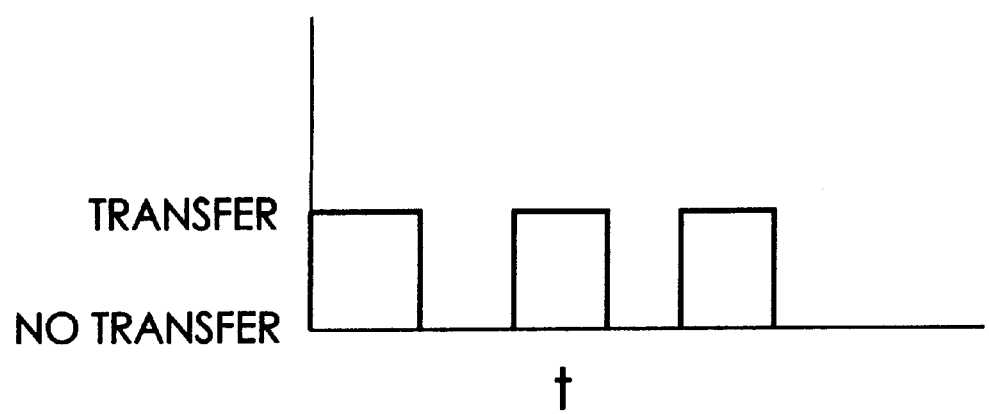
FIG. 5 is a timing diagram illustrating throttling of data transfer to control heating while transferring data to a computer apparatus while enclosed in its shipping package according to the invention.

One possible problem is overheating in the unintended operating environment of the package 100. This may or may not be a problem depending on the time required for the download. To some extent the problem is reduced by providing ventilation ports to the package 100 such as the apertures 195 (FIG. 1). A further measure is indicated in FIG. 5 involves "throttling" the data flow. The heat generated in the housing 110 will decrease when no data is being transferred because less media operation is required and use of facilities is less. By shutting down the data flow as indicted in FIG. 5 the server 400 can extend the amount of data which can be transferred. To do so, however, requires that the total transfer time be extended by the time data transfer is shut down. If heat problems are serious, transfers could be done in part with the machine powered down in between.

The final result desired however is to have the computer apparatus configured and loaded with applications in the packaging for delivery to the user site.

The invention in a preferred form has been described in detail with reference to the drawings. It should be appreciated that various alternatives and variations will be suggested to those skilled in the art which are within the contemplation of the invention and reference should be had to the claims to determine the scope of the protected invention. For example while a connector has been shown any coupler including infrared and radio couplers that would allow a data transfer to a network would allow the inventive solution to be implemented. Also for systems such as laptops the power source may be internal and the power switch may connect the source such as a battery to energize the system.

What is claimed is:

1. A method for configuring, in its shipping package, an electronic device of a type specially adapted to transfer data over a network connector for establishing external data connection, said electronic device having a storage medium for receiving and retaining data, a power connector for energizing operation and self test logic which prevents data transfer to the storage medium, said method comprising the steps of:

coupling through said package to the network connector of said electronic device and connecting a data server apparatus thereto;

disabling the self test logic;

accessing through said package the power connector of said electronic device and energizing said electronic device;

transferring signals to said electronic device through said network connector to set up data transfers to the storage medium of said electronic device; and transferring data to the storage medium of said electronic device for storage therein, whereby said electronic device is configured at least in part in its shipping package.

2. A method for configuring according to claim 1 wherein the steps of coupling to the network connector and accessing said power connector include a step of perforating said shipping package to gain access thereto.

3. A method for configuring, in its shipping package, a computer system of a type that normally boots from a storage medium and sets, using self test logic, an error condition if predefined input devices are not connected at connection ports of the system, the computer system having a network connector for external data exchanges, said method comprising the steps of:

accessing through said shipping package the network connector of said system and attaching a network cable thereto;

accessing through said shipping package a power connector of said system and attaching a power source thereto;

disabling said self test logic;

transferring initializing signals to said computer system through said network connector to set up data transfers to a storage media of said computer system;

transferring at least configuration data to the storage media of said system which is stored therein whereby said computer system is configured at least in part in its shipping package.

4. A method according to claim 3 wherein said step of transferring data transfers configuration, operating system and application program data for storage.

5. A method according to claim 3 wherein the step of transferring at least configuration data includes the steps of halting transfer intermittently whereby time is allowed for heat to be dissipated.

6. A method according to claim 3 wherein a step of cooling the computer system by forcing cooling air into the package is added.

7. A method according to claim 3 wherein the steps of accessing said network connector and said power connector include a step of perforating said shipping package to gain access to said connectors.

8. A method according to claim 3 wherein accessing said power connector and connecting a power source involves actuating a switch to connect an internal power source to energize the system.

* * * * *